UNITED STATES PATENT OFFICE.

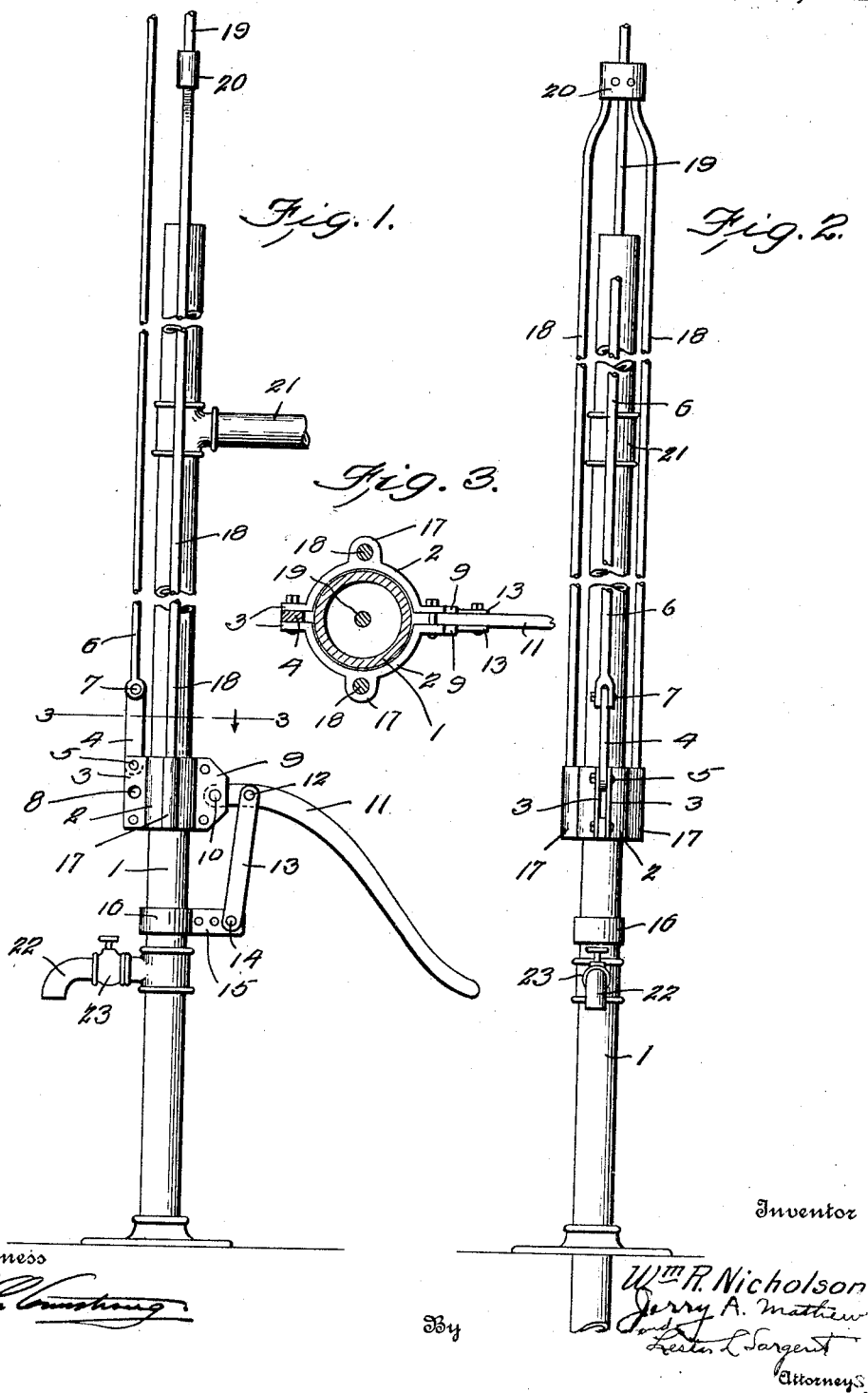

WILLIAM R. NICHOLSON, OF BEAVER CITY, NEBRASKA, ASSIGNOR OF ONE-HALF TO C. E. V. SMITH, OF BEAVER CITY, NEBRASKA.

ATTACHMENT FOR WINDMILL-OPERATED PUMPS.

1,374,385.   Specification of Letters Patent.   Patented Apr. 12, 1921.

Application filed July 21, 1919. Serial No. 312,245.

*To all whom it may concern:*

Be it known that I, WILLIAM R. NICHOLSON, a citizen of the United States, residing at Beaver City, in the county of Furnas and State of Nebraska, have invented a new and useful Attachment for Windmill-Operated Pumps, of which the following is a specification.

The object of my invention is to provide novel and improved means for operatively connecting a pump with a windmill or other suitable source of power, at will, and by means external to the pump shaft or pipe, to provide novel means for raising the water to an elevated branch pipe; and to eliminate the stuffing box heretofore employed in pumps of this type. It is further an object of my invention to provide a device which can be readily disconnected from the windmill, to permit of manual operation of the pump. It is further an object of my invention to provide a device of relatively simple construction which may be readily assembled and disassembled. I attain these and other objects of my invention by the mechanism illustrated in the accompanying drawings, in which—

Figure 1 is a side elevation of the attachment applied to a pump;

Fig. 2 is a similar view except that it is at right angle to Fig. 1; and

Fig. 3 is a horizontal section on line 3—3 of Fig. 1.

Like numerals designate like parts.

Referring to the accompanying drawings 1 designates the pipe or shaft which contains the pump, the pump being operated by pump rod 19 to which rods 18 are affixed by means of a suitable collar 20. Rods 18 are attached to opposite lugs 17 of a sliding sleeve 2, which engages around the pump shaft or pipe 1. Sleeve 2 is provided with suitable flanges 3 having spaced openings 8, to one of which is adjustably secured link 4 by a releasable fastening device 5, the link 4 being in turn attached to operative rod 6 by a suitable pivot 7. The rod 6 is operatively connected with and driven by the windmill. Sleeve 2 is provided with flanges 9 to which pump handle 11 is attached by a suitable pivot 10. The pump handle swings about the pivot 12 by which it is attached to suitable links 13, the lower ends of which are adjustably secured to the laterally extending ear 15 of collar 16, which is rigidly attached to the pipe 1. Pipe 1 is provided with a faucet 22 of ordinary construction having a shut-off valve 23. Opening out of pipe 1 at an elevated position thereof I provide a suitable branch pipe 21 through which the water may be distributed continuously to any desired destination, or to a supply tank. Sleeve 2 may if desired be disconnected from the windmill and a suitable reciprocating connection with any suitable engine or motor operatively attached to opening 8 of flanges 3 of sleeve 2, and the pump operated by means of the operative connections of sleeve 2 with pump rod 19 by means of rods 18 and collar 20.

In the ordinary operation of the pump by the windmill, rod 6 and link 4 reciprocate vertically and actuate sleeve 2, which thereby operates rods 18 and pump rod 19, to which rods 18 are rigidly attached by means of pawl 20. By unlinking link 4 from flanges 3 of sleeve 2 the pump may be operated manually by means of the handle 11. This device eliminates the stuffing box customarily utilized in connection with windmill operated pump, and the insanitary condition resulting from the use of the stuffing box.

What I claim is:

1. In an attachment for windmill operated pumps, the combination with a pump, of a vertically slidable sleeve mounted on the pump, said sleeve having flanges, a pump handle pivotally mounted between the flanges, a collar attached to the pump shaft below the slidable sleeve, said sleeve having an extended ear, having a plurality of openings therein, a link adjustably connecting the pump handle to the extended ear of the aforesaid collar, means for connecting the slidable sleeve to the reciprocating piston rod and means attached to the slidable sleeve and operatively connecting same with the windmill, substantially as and for the purpose described, whereby the device may be operated either by power or manually.

2. In an attachment for windmill operated pumps, the combination of a pump shaft, a sleeve vertically slidable on the pump shaft, means for connecting the slidable sleeve to the reciprocating piston rod, a pump handle pivotally attached to the aforesaid sleeve, means including a pivoted link member for securing the pump handle at a given point in a fixed position relative to the pump shaft, and a hinged rod adjustably linked to a flanged portion of the aforesaid slidable sleeve, whereby the operative connections between the windmill and the reciprocating piston rod are disposed exterior to the pump shaft, for the purposes described.

WILLIAM R. NICHOLSON.